(12) United States Patent
May et al.

(10) Patent No.: US 6,346,812 B1
(45) Date of Patent: Feb. 12, 2002

(54) CONDITIONER CIRCUIT FOR MAGNETIC FIELD SENSOR

(75) Inventors: Lutz Axel May, Berkshire (GB); Adrian Paul Brokaw, Burlington, MA (US)

(73) Assignee: Fast Technology AG (DE)

( * ) Notice: Subject to any disclaimer, the term of this patent is extended or adjusted under 35 U.S.C. 154(b) by 0 days.

(21) Appl. No.: 09/423,888

(22) PCT Filed: May 13, 1998

(86) PCT No.: PCT/GB98/01357

§ 371 Date: Nov. 12, 1999

§ 102(e) Date: Nov. 12, 1999

(87) PCT Pub. No.: WO98/52063

PCT Pub. Date: Nov. 19, 1998

(30) Foreign Application Priority Data

May 13, 1997 (GB) .............................................. 9709710

(51) Int. Cl.[7] .............................................. G01R 33/04
(52) U.S. Cl. ........................................ 324/253; 324/225
(58) Field of Search ............................... 324/253, 254, 324/255, 117 R; 33/361

(56) References Cited

U.S. PATENT DOCUMENTS

| 4,859,344 A | * | 8/1989 | Webb | 324/253 |
| 5,124,648 A | | 6/1992 | Webb et al. | 324/253 |
| 5,239,264 A | * | 8/1993 | Hawks | 324/253 |
| 5,351,555 A | | 10/1994 | Garshelis | 73/862.335 |
| 5,419,206 A | * | 5/1995 | Kamioka et al. | 73/862 |
| 5,465,627 A | | 11/1995 | Garshelis | 73/862.335 |
| 5,520,054 A | | 5/1996 | Romo | 73/715 |
| 5,520,059 A | | 5/1996 | Garshelis | 73/862.335 |
| 5,591,925 A | | 1/1997 | Garshelis | 73/862.335 |
| 5,642,046 A | * | 6/1997 | Hawks | 324/253 |
| 6,047,605 A | | 4/2000 | Garshelis | 73/862.336 |

FOREIGN PATENT DOCUMENTS

| DE | 45509 | 2/1982 |
| DE | 490309 | 6/1992 |
| JP | 60-57277 | 4/1985 |

* cited by examiner

*Primary Examiner*—Safet Metjahic
*Assistant Examiner*—Subhash Zaveri
(74) *Attorney, Agent, or Firm*—Robert C. Kain, Jr.; Fleit, Kain

(57) ABSTRACT

A circuit for sensing a magnetic field has at least one saturable coil (L1). The circuit includes switches (S1, S2) controlled by a comparator (12) to drive the coil (L1) to saturation by alternating polarities of current. In the absence of an external magnetic field the currents are balanced. An applied external magnetic field causes an unbalance in the coil (L1) in reaching saturation. An unbalance current is applied through a sensing resistor (R2) to an integrator (20) to develop an output voltage ($V_o$) as a measure of the applied magnetic field. The switches (S1, S2) are implemented by transistor switches. Dual (FIG. 1) and single (FIG. 2) supply rail circuits are disclosed. The circuit finds particular application in torque transducers using magnetoelastic elements.

21 Claims, 2 Drawing Sheets

CONDITIONER CIRCUIT FOR MAGNETIC FIELD SENSOR

FIELD OF THE INVENTION

Figure 1:
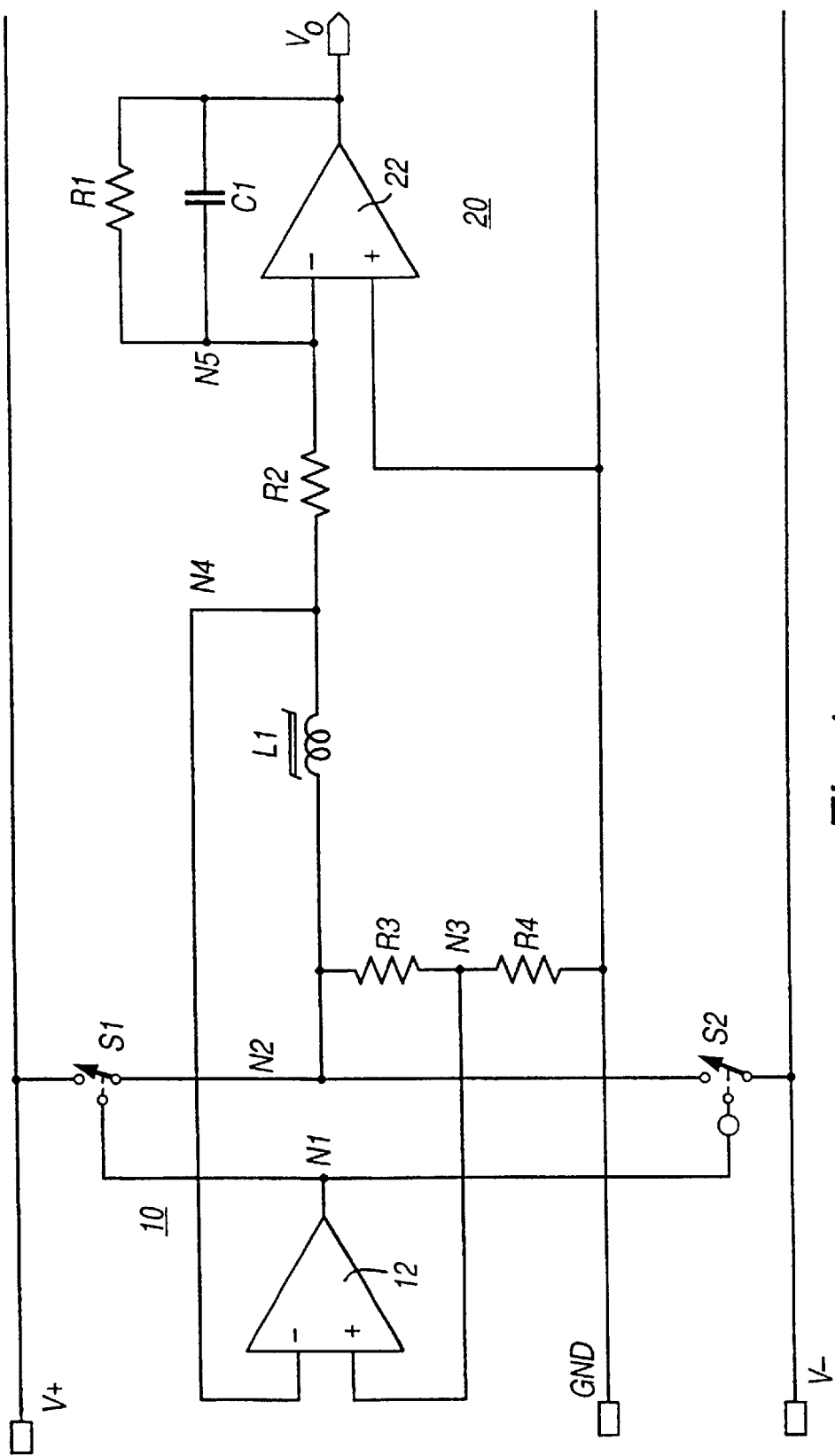

This invention relates to a circuit for use with a sensor responsive to magnetic fields, and has particular, though not exclusive application, to what is known as a torque sensor.

Magnetoelastic torque sensors are known in the art. They are used to sense a magnetic field emanated by a magnetoelastic element mounted to a shaft due to the torque resulting from rotation or attempted rotation of a shaft. The rotation of any shaft from one end to drive a load at the other end generates torque in the shaft due to differential angular displacement (which may be very small) between the point at which drive is applied and the point at which the load is driven. If magnetoelastic means generating a magnetic field is associated with a shaft the field becomes distorted by the torque in the shaft and such distortion can be sensed as a measure of torque.

BACKGROUND TO THE INVENTION

It has further been proposed to sense the distortion of the magnetic field away from its quiescent (non-torque) state by arrangements of one or more coils placed in the close vicinity of the shaft in a non-contacting arrangement allowing the shaft to rotate within the coil assembly. More particularly, because of the small changes in magnetic field due to applied torque, it has been proposed to use saturable coils (inductors) driven into saturation so that the point of saturation of a coil, with respect to a drive current, depends on the magnetic field associated with the shaft. The points of saturation for the opposite drive polarities in the coil become unbalanced due to the presence of an external field and it is this unbalance that is sensed. Circuitry responsive to the point of saturation is used to develop an output signal representing torque.

Magnetoelastic torque sensing in general can thus be divided into two parts: one is the magnetoelastic element and the arrangement for mounting one or more sensors with respect to the shaft—the torque transducer; and the other is the sensing circuit connected to the one or more sensors and processing the resultant signals—the signal conditioner. The sensor of interest here is one or more coils.

The present invention is concerned with the sensing circuit. The actual arrangement of the one or more magnetic coils is not the concern of this invention.

By way of example, a magnetometer using a saturating inductor and the associated circuitry is described in U.S. Pat. No. 5,124,648 (Webb and Brokaw). More detailed information on the mounting of torque sensor coils (inductors) with respect to rotary shafts is to be found in U.S. Pat. No. 5,520,054 (Garshelis). Reference may also be made to a technical paper published by the Society of Automotive Engineers (SAE), "Development of a Non-Contact Torque Transducer for Electric Power Steering Systems", SAE Technical Paper Series, No. 920707, I. J. Garshelis, K. Whitney and L. May, reprinted from: Sensors and Actuators, 1992 (SP-903), International Congress and Exposition, Detroit, Mich., Feb. 24–28, 1992, pp. 173–182. Further discussion of torque transducers is found in "A Single Transducer for Non-Contact Measurement of the Power, Torque and Speed of a Rotating Shaft", I. J. Garshelis, C. R. Conto and W. S. Fiegel, SAE Technical Paper Series, No. 950536, reprinted from: Sensors and Actuators (SP-1066), International Congress and Exposition, Detroit, Mich., Feb. 27–Mar. 2, 1995, pp. 57–65, particularly pp. 58–59.

An example of a commercially-offered magnetoelastic torque transducer is that offered under the trade mark TorqStar by the Lebow Products division of Eaton Corporation, 1728 Maplelawn Road, Troy, Mich., U.S.A.

The signal conditioner circuit described in U.S. Pat. No. 5,124,684 is used with a single winding magnetometer sensor — a saturable inductor. The inductor is grounded and the ungrounded end driven by an oscillator. An integrator arrangement makes a difference measurement at the ungrounded end due to an unbalanced sensed field and actively nulls the field in the inductor core. A voltage indicative of the unbalancing magnetic field is measured by an amplifier and used to create a feedback current into the inductor derived from the output voltage to null the imbalance. This nulling current is applied through a resistor to act as a current source but the value of the current is dependent also on the inductor resistance which is uncertain and temperature sensitive. U.S. Pat. No. 5,039,945 addresses this problem and proposes a solution having a great deal of added complication.

Another circuit for measuring a magnetic field is described in Patent Abstracts of Japan vol. 009, No. 186 (p. 377) and JP 60057277A. The Abstract discloses an amplifier connected in a self-excited oscillator including a feed-back transformer having a saturable core sensitive to an external magnetic field. The transformer has a first winding connected at the output of the amplifier and a second winding connected to the input of the amplifier. An adjustable resistor in series with the first winding is adjusted to give the best possible square wave output from the amplifier. The voltage output which is obtained across the series connection of the first winding and the adjustable resistor is applied to a measuring amplifier.

SUMMARY OF THE INVENTION

The present invention is based on the recognition that the unbalance current in the sensor coil due to the external field can be used directly as a measurement parameter, thereby avoiding the need to generate the nulling or compensating current of the prior art.

Aspects and features of the present invention for which protection is presently sought are set out in the accompanying claims.

BRIEF DESCRIPTION OF THE INVENTION

Figure 2:
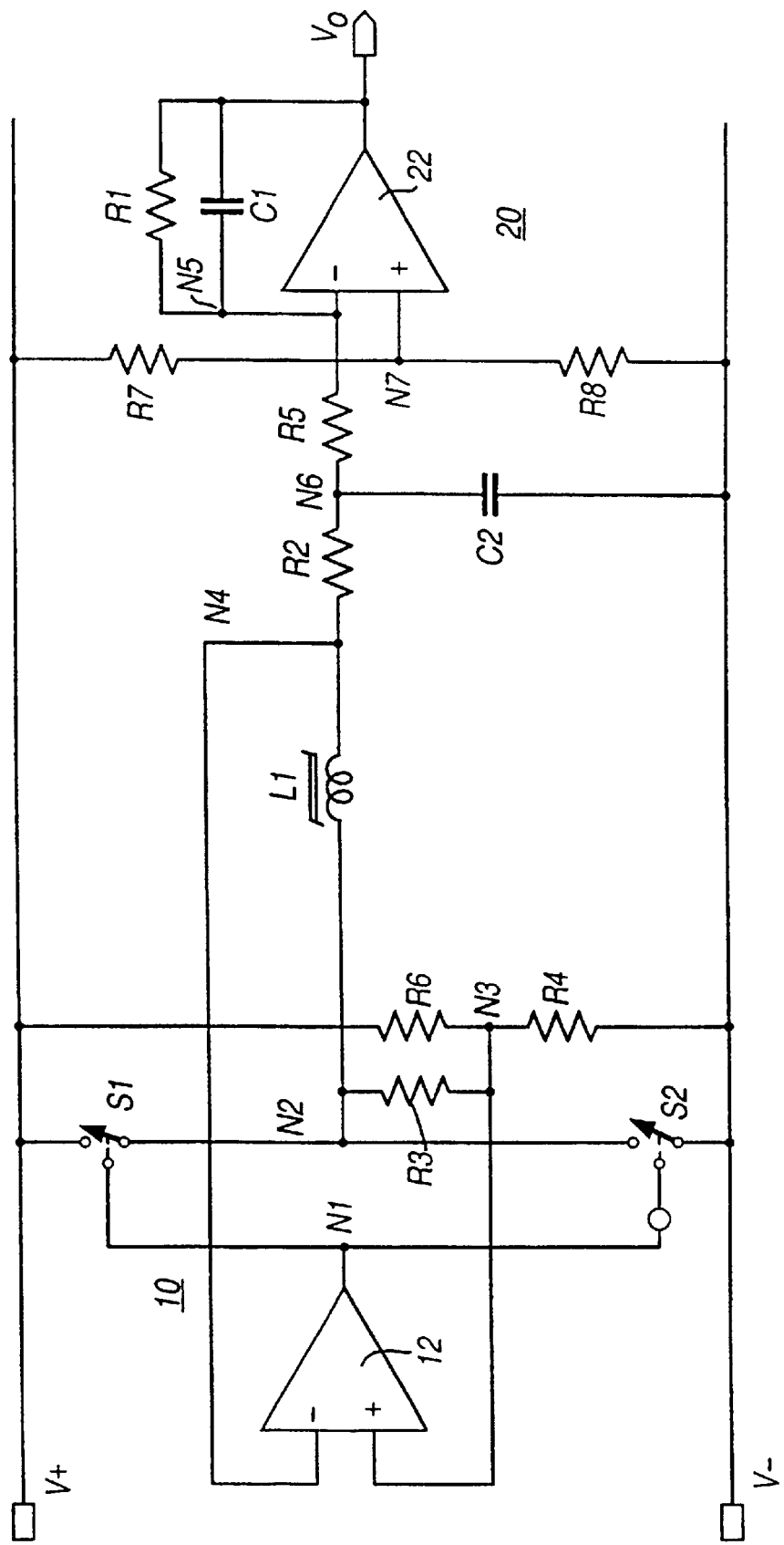

The invention and its practice will now be described with reference to the accompanying drawings, in which:

FIG. 1 is a simplified circuit diagram illustrating the principle of the invention in a signal conditioner for a dual rail power supply; and FIG. 2 is a simplified circuit diagram illustrating a modification of the FIG. 1 circuit in a signal conditioner for a single rail power supply;

THE PREFERRED EMBODIMENTS

Referring to FIG. 1, the saturable inductor for sensing the magnetic field is denoted L1. Although a single coil is shown, the torque transducer may use a number of coils. Arrangements having two or four coils have been proposed. As already explained the transducer construction itself is not part of this invention. If multiple coils are used, then they may be series connected so that the coil L1 represents the series of coils in such a case. Series connection of multiple coils is not essential.

The circuit of FIG. 1 comprises two linked portions, a driver circuit 10 for coil L1 in which the coil is an integral part of a switched oscillator, and a current measuring circuit 20 responsive to the unbalance current in the coil due to the applied external magnetic field sensed by the transducer. The driver and current measuring circuits are connected between positive and negative supply rails V+ and V− assumed of equal magnitude with respect to ground GND.

In the driver circuit 10, a comparator 12 acts as a switched amplifier whose output (high or low) at node N1 controls two switches S1 and S2 connected in series between rails V+ and V− with an intermediate node N2 between them. When node N1 is high S1 is closed (ON), S2 is open (OFF). When node N1 is low, S2 is ON, S1 is OFF. The switches S1, S2 control the alternate application of the voltages V+ and V− to one terminal of coil L1 connected at node N2. The other end of coil L1, indicated as node N4, is connected through a current sensing resistor R2 to a virtual ground point N5; that is N5 is held at GND potential in the measuring circuit 20. Resistor R2 acts both as an element of the oscillator driver 10 and of the measuring circuit 20, as will be further described below. The inductor L1 is alternately connected in each oscillator cycle between V+ and GND in one half cycle and between V− and GND in the other to have applied to it a square wave voltage as the comparator circuit switches state.

The action of the driver circuit is dependent on the currents developed in response to the opposite polarities of the square wave drive voltage as follows.

Node N2 is connected to ground through series resistors R3 and R4 selected to set switching levels for the comparator as will be described. The node N3 between them is connected to the non-inverting input (+) of comparator 12 to provide a bias voltage at this input. The node N4 is connected to the inverting input (−) of comparator 12. Circuit values including R2, R3 and R4 are selected so that with the comparator output high and with S1 ON, as long as the current in coil L1 is low, the voltage at N4 will be lower than that at N3. The positive voltage at N2 applied across coil L1 initially causes the inductor current to ramp up, that is to increase approximately linearly. R2 is selected to keep the voltage at node N4 below that at node N3 (which is not current dependent) for the duration of the current ramp in L1. It will be seen that the bias (whose value is set by R3, R4) at node N3 is in the same polarity sense as the voltage applied to the inductor, thereby applying a positive feed back to the non-inverting input of the comparator. However, as L1 begins to saturate the current through it rises non-linearly and abruptly. The increased current through R2 causes the voltage at N4 to rise above that at N3 whereupon the comparator switches state, driving its output node N1 low to turn OFF S1 and turn ON S2. Consequently, node N2 goes to V− reversing the polarity of voltage applied to the coil L1. Now the bias at node N3 re-inforces the state of the comparator with its output low. The second half-cycle commences.

The previous saturating current in coil L1 will now decay and then reverse due to the V− voltage applied to the coil. The current in the coil now ramps up in the opposite direction with the voltages to the comparator now being developed in the opposite sense to those described above. A complementary switching action to that in the first half cycle results so that as the voltage at N4 rises negatively above that at N3, the comparator changes state to complete a cycle of operation.

It is assumed thus far that the torque transducer has been set up so that there is no net magnetic field acting on coil L1.

The cycle of operation will repeat, and in the absence of a magnetic field at the coil, the circuit will operate as a symmetrical free running oscillator. The frequency of operation will be determined by the supply voltages (assumed to be equal in magnitude) and the saturation characteristics of the coil. Typical frequencies are in the range of a few tens to a few hundreds of kHz. While the signal across the coil is symmetrical in voltage and time, the current through the coil will average to zero, when integrated over a complete cycle.

If the core of the coil is subjected to a magnetic field, the field will aid the build-up of flux in the core for one polarity of the driving voltage, and oppose it for the other polarity. This will upset the symmetry of the continuing oscillation. As a result, a net current will flow in the coil. This current will be in opposition to the magnetic field. When the current produces a field which exactly cancels the external field, the balance of the oscillation will be restored, but the current will persist to maintain equilibrium.

The current will be in direct proportion to the applied external field, so that measurement of this non-zero average current will be an accurate representation of the field.

Attention will now be given to the measuring circuit portion 20 of the signal conditioner. As will be described, the measuring circuit acts as a current-to-voltage converter. It converts the average current in the coil L1 to a proportionate voltage. This converter employs a conventional integrator using an operational amplifier 22.

The integrator operation is determined by the input sensing resistor R2 and the feedback components. The latter are an integrating filter capacitor in parallel with scaling resistor R1. The non-inverting input of the op-amp. 22 is connected to ground GND so that the feedback action serves to maintain the inverting input—node N5—at a virtual ground potential. The op-amp itself nonetheless presents a high impedance input. As is well known the current in coil L1 that flows through R2 to the virtual ground node N5 also flows in the parallel combination C1 and R1. The filtering or integrating action of C1 over a cycle of oscillation of the coil driver circuit is to absorb the large current transients (positive and negative) which are generated in L1. If the transducer coil is operating in balanced mode (no external field), these transients cancel and the integrator output remains at ground potential. If, however, there is an unbalance due to the presence of a magnetic field, then as explained above there will be a net average current over the oscillation cycle. That average current must flow through RI so that the output of the integrator will produce a voltage Vo proportional to the average current and thus to the magnetic field which gave rise to it. The polarity of the output voltage Vo will reflect the polarity of the average current and thus of the external magnetic field (the integrator has an inherent inverting function).

Considering further the operation of the circuit of FIG. 1, it is emphasized that the circuit is essentially current operated and that the desired operation can be achieved with various power supply arrangements. A circuit specifically for a single supply polarity voltage is given below but the principles of current operation can be employed in various power supply arrangements. This will be further discussed.

Referring again to FIG. 1, when the oscillator/driver 10 is running, the switches S1, S2 are operated so as to apply an alternating drive signal to the coil L1. The switching of the drive is initiated by the comparator 12 in response to voltage applied to its inputs. Since the integrator amplifier 22 operates to make node N5 a virtual ground, the voltage at N4 will be given by the product of the resistance R2 and the instantaneous coil current. This voltage then, is a direct measure of the coil current.

The voltage at N4 is compared to the voltage at N3. After the drive switches polarity, the coil current builds up until it reaches the level which makes the voltage on N4 equal to the voltage on N3, whereupon, the switches are operated by the comparator to reverse the drive for the next half cycle.

In order to detect a magnetic field acting on the core of the coil, the coil should be driven until the core reaches the non-linear portion of its B-H characteristic. For a given design of the coil and core combination, the current level in the coil will be an indicator of the degree is of saturation of the core. For a given application, R2 is selected to produce a desired voltage when the core has been driven to the proper region. This voltage is used to switch the drive.

In the case where no external field is present in the core, the current in the coil, averaged over a complete cycle, should be zero. If it is not, the average current will have to be carried away by the amplifier, to maintain N5 at zero. This current will flow through R1, and indicate that there is some signal present, when in fact there is none.

Therefore, it is important that the comparator triggers and operates the switches when the coil current reaches the same magnitude in each polarity. This current level will indicate that the core has reached the same percentage of saturation in each direction, and the average current will be zero.

The level at which the comparator triggers is set by the voltage on N3, to which the voltage of N4 is compared. To make the current switching levels of the coil match, the voltage applied to N3 must be of equal magnitude, in both directions.

Thus it is an important feature of the torque sensor signal conditioner circuit that the driver switches on reaching equal current levels in the sensor coil L1 in the two directions. In FIG. 1, this is done by developing a voltage proportional to the current and comparing it to the appropriate half-cycle voltage of an alternating drive voltage which, in the illustrated embodiment, has equal magnitudes in both directions.

This voltage is obtained by tapping off the drive, which is symmetrical, in the illustrated embodiment.

As a practical matter, it may be difficult or at least costly to make switches with sufficiently low resistance to make the drive as symmetrical as might be wished. However, even if the drive voltages are somewhat mismatched, the circuit will operate properly, so long as the comparator trigger points are made to match in the two directions. The lack of voltage symmetry will be accommodated automatically by a change in the duty ratio (departing from exactly 50% of the drive signal), so as to preserve the average current to the integrator at zero, when no signal is present.

An alternative way of obtaining this result, in the absence of a symmetrical drive, might be to generate the voltage for the + input of the comparator from a fixed amplitude square wave, switched in synchronism with the driver.

The circuit described above uses positive and negative power supplies, V+ and V−, with respect to ground. As noted above, in the illustrated case, the power supply rails V+ and V− are symmetrical with respect to ground. It is often the case, for example in automotive systems, that only a single supply polarity voltage supply is available. In order to drive the sensing coil with opposite polarity voltages, an effective operating ground potential has to be established. FIG. 2 shows a circuit modified for this purpose. The operation of the circuit is essentially as the circuit of FIG. 1 so that only the modifications will be described.

In FIG. 2 the potential of the virtual ground at node N5 is established at the potential of node N7 set by the series resistors R7, R8 connected as a divider across the supply rails. The switching of the oscillator/driver 10 has therefore to be modified to swing about this virtual ground potential.

Switching levels for the comparator are set by resistors R3, R4, R6. The bias for the non-inverting input (node N3) of comparator 12 is now set by divider resistors R4, R6 connected between the supply rails. The switched voltage at node N2 is applied to node N3 through R3. R3 still drives N3, but now with respect to a voltage determined by the ratio of R6 to R4. Generally (but not necessarily) these two resistors will be made equal, so the N3 signal will be driven between two voltage levels equally above and below half the power supply voltage. The divider ratio setting these levels will be given by the resistance of R3 and the parallel resistance of R6 and R4.

As mentioned, the integrator amplifier produces the "virtual ground" as the voltage at N7. If the ratio of R7 to R8 is the same as the ratio of R6 to R4, the integrating amplifier average output voltage should be the same as the voltage at N7 when no magnetic field is present at the sensor. If these ratios differ, the voltage difference between the N7 voltage and the average N3 voltage will be developed across R1 on the average with zero signal. A magnetic field applied to the sensor coil L1 will cause a change in the output exactly as described above, but with reference to the no-field voltage just described.

The no-field offset voltage resulting from the R6/R4 ratio differing from the R7/R8 ratio can be used to shift the indication point if desired. More commonly, though, both these ratios will be set to 1/1 so that the no-field output will be at half the supply line voltage.

An alternative arrangement which can be used to ensure that the reference voltage for the oscillator circuit is the same as the reference for the integrator, is to use a unity gain buffer from N7. This buffer controls a resistor like R4 in the circuit of FIG. 1. In that case, R6 is not used, and the lower end of R4 is held at the N7 potential by the buffer. The voltage at N3 will now swing around the N7 potential; symmetrically if N7 is at half the supply voltage. This arrangement may be beneficial in an IC implementation, since it avoids the need to match the two resistor ratios.

A second feature of the single supply circuit illustration (which is also applicable to the circuit of FIG. 1) employs a second filter capacitor, C2, in the path of N4 to the virtual ground at N5. The current sensing resistor is now constituted by two series resistors R2, R5 from whose junction N6 the capacitor C2 is connected to V− to provide a filter circuit.

This extra capacitor will reduce the ripple current from the oscillator which must be supplied by way of C1. This addition will permit C1 to be reduced and thereby increase the speed of response to changes in magnetic signal and torque, at a given level of output voltage ripple.

If it is desired to refer the output signal to a voltage different from exactly half the supply voltage, R7 and R8 could be adjusted to a ratio other than 1:1, and R4, R5 and R3 could be adjusted so that the voltage at N3 would make symmetrical excursions around the voltage at N7 as the drive is switched to V+ and V−, this would satisfy the requirement to make the drive switching levels symmetrical in peak current. As a result, the zero field condition of the core would result in the output being at the N7 voltage.

Having said all this, it is to be noted that there will be some small error associated with asymmetric drive. This is due to a difference in core losses between the unequal voltages of alternate half cycles. This error is small, however, depending somewhat on the quality of the coil and core. It will generally be much smaller than required to allow for inequality of the switch voltages, and in some cases will allow a substantial offset as described for N7.

When a signal (magnetic field) is present, a signal current will flow in the core, superimposed on the switching current. This will slightly disturb the balanced switching. However, since this disturbance is signal dependent, it will become part of the overall gain factor of the system and will simply appear as a gain variability depending upon the ratio of R1 to R2.

The signal current will generally be small compared to the switching threshold and so the effect may often be neglected altogether.

The circuits of FIG. 1 and FIG. 2 have shown the switches S1 and S2 diagrammatically in order to assist in understanding the principles of operation. It will be understood that in practice the switches will be implemented by means of semiconductor devices. For example, a complementary pair of NPN and PNP transistors in series between the V+ and V− rails.

S1 comprises the PNP transistor having its emitter connected to the V+ rail. S2 comprises the NPN transistor having its emitter connected to the V− rail. The collectors are connected together to provide node N2. Appropriate base drive circuitry for the pair of transistors is well within the compass of those in the art.

The circuit arrangements described above are shown in terms of discrete components. Much of the circuitry could be realised in an integrated circuit. It is also to be noted that the integrator output voltage Vout may swing positive or negative dependent on the direction of the sensed magnetic filed. The feedback capacitor C1, which may typically be 47 $\mu f$, should be chosen to be capable of being biased to either polarity or may be constituted by a pair of oppositely poled electrolytic capacitors.

Referring again to the operation of the circuit illustrated in FIG. 1, the circuit operates with positive and negative voltage rails of equal magnitude. However, it is to be noted that the switching of the comparator 12 is a function of the current in inductor L1. It will be recalled that when drive voltage of either polarity is applied to the inductor L1, the current in it rises linearly until the inductor saturates, whereupon the current rises sharply to cause the comparator to switch and initiate the next half-cycle of operation. Consequently the switching of the comparator on the current levels may be affected by asymmetries in the circuit elements and/or applied voltages. Thus generally it is desirable to seek to match the current levels (positive and negative) at which switching occurs in aiming to achieve the desired zero average current over each full oscillator cycle in the absence of an external magnetic field to unbalance the cycle.

Another way of expressing the balancing to zero average current in each oscillator cycle is to balance the voltage time product integral of the two half-cycles. Here the voltage is the actual drive voltage across the sensing inductor L1 and time is the period for which that drive voltage is applied before the current-controlled switching.

The circuits illustrated in FIGS. 1 and 2 seek to assist in achieving such balance and equality of current-switching by effectively establishing symmetry of the positive and negative voltage rails together with symmetry of the switching circuitry through S1 and S2 for applying voltage to the inductor. However, it will be appreciated from the foregoing discussion that this kind of symmetry is not essential. Balancing of the circuit as discussed above can still be met.

The foregoing description of signal conditioner circuits in accord with the invention has been in the context of a circuit for use in torque sensing. However, it will be appreciated that the described circuit is more generally applicable to measuring magnetic fields including, for example, fields due to the flow of electric current.

What is claimed is:

1. A circuit arrangement for measuring a magnetic field including:

a saturable inductor for sensing a magnetic field to be measured;

an oscillator circuit connected to said inductor for driving said inductor with a voltage waveform that causes current flow in the inductor to saturate the inductor in opposite directions in successive half cycles;

means including a current-to-voltage converter connected to said inductor to generate an output signal representing the imbalance of saturation in successive half-cycles due to the magnetic field to be measured, wherein the improvement comprises:

said oscillator circuit is operable to drive said inductor to produce an average current in the inductor per oscillator cycle which is a measure of said imbalance, and said current-to-voltage converter is connected in a circuit path through which inductor current flows and is responsive to said average current in the inductor to generate a voltage representing said average current.

2. A circuit arrangement as claimed in claim 1 in which said circuit path includes a virtual ground node to which said inductor current flows.

3. A circuit arrangement as claimed in claim 2 wherein said current-to-voltage converter comprises an integrator.

4. A circuit arrangement as claimed in claim 1 in which said current-to-voltage converter includes an integrator which has a circuit node that acts as a virtual ground, said oscillator includes means connected to one terminal of said inductor to supply thereto a voltage waveform having half-cycles of opposite polarity with respect to the potential of said node, and the other terminal of the inductor is connected to said node.

5. A circuit arrangement as claimed in claim 3 in which said integrator includes an amplifier and a feedback capacitance parallel with resistance connected in a negative feedback loop from the output of the amplifier to said circuit node.

6. A circuit arrangement as claimed claim 1 in which said oscillator includes an amplifying device and sensing resistance in series with said inductor and responsive to the current through the inductor to develop a feedback voltage causing oscillation of said amplifying device.

7. A circuit arrangement as claimed in claim 4 in which said oscillator includes an amplifying device and a sensing resistor connected between said other inductor terminal and said node to develop a feedback voltage dependent on the current through said inductor for causing oscillation of said amplifying device.

8. A circuit arrangement as claimed in claim 7 in which said series resistance has a capacitor connected thereto to shunt the path to said node so as to provide a filter for the current delivered to the integrator.

9. A circuit arrangement as claimed in claim 8 in which said series resistance includes two resistors in series and said shunt capacitor is connected to a point intermediate said two resistors.

10. A circuit arrangement as claimed in claim 1 in which said oscillator includes an amplifying device alternately switchable between first and second states in the oscillation cycles and first and second switch means connected in series between supply voltage rails, said inductor being connected to a node between said switch means and said amplifying device being connected to control the switch means to open and close said first and second switch means respectively when said amplifying device is in said first state and to close and open said first and second switch means respectively when said amplifying device is in said second state.

11. A circuit arrangement as claimed in claim 6 in which said amplifying device is alternately switchable between first and second states in the oscillation cycles and the oscillator further includes first and second switch means connected in series between supply voltage rails, said inductor being connected to a node between said switch means, and said amplifying device being connected to said switch means to open and close said first and second switch means respectively said amplifying device is in said first state and to close and open said first and second switch means respectively when said amplifying device is in said second state.

12. A circuit arrangement as claimed in claim 6 in which said amplifying device comprises a comparator.

13. A circuit arrangement as claimed in claim 1 in which said inductor is connected within a feedback loop of said oscillator and acts as a frequency determining element thereof.

14. A circuit arrangement for measuring a magnetic field including:
   a saturable inductor for sensing a magnetic field to be measured;
   an oscillator circuit connected to said inductor for driving said inductor with a voltage waveform that causes current flow in the inductor to saturate the inductor in opposite directions in successive half-cycles, said oscillator circuit includes means switchable between two states to generate said voltage waveform;
   means connected to said inductor to generate an output signal representing the unbalance of saturation in successive half-cycles due to the magnetic field, wherein the improvement comprises:
   said inductor is connected in a circuit path through which the inductor current flows and including current sensing means connected to said switchable means to develop a current-dependent signal causing switching of said switchable means to generate said voltage waveform, and a virtual ground point provided by said output means, said output means being responsive to the current at said virtual ground point.

15. A circuit arrangement as claimed in claim 14 in which said switchable means comprises a comparator.

16. A circuit arrangement as claimed in claim 14 further including bias means for setting the levels at which said switchable means changes state in dependence upon the sensed current levels.

17. A circuit arrangement as claimed in claim 14 in which said output means includes an integrator acting as a current-to-voltage converter and providing said virtual ground point at its input.

18. A circuit arrangement as claimed in claim 14 in which said current sensing means includes resistance.

19. A circuit arrangement as claimed in claim 16 in which said bias means includes a resistor arrangement.

20. A circuit arrangement for measuring a magnetic field comprising:
   a saturable inductor for sensing a magnetic field to be measured;
   an oscillator circuit connected to said inductor for driving said inductor with a voltage waveform that causes current flow in the inductor to saturate the inductor in opposite directions in successive half cycles;
   means including a current-to-voltage converter connected to said inductor to generate an output signal representing the imbalance of saturation in successive half-cycles due to the magnetic field to be measured;
   said oscillator circuit is operable to drive said inductor to produce an average current in the inductor per oscillator cycle which is a measure of said imbalance, and
   said current-to-voltage converter is connected in a circuit path through which inductor current flows and is responsive to said average current in the inductor to generate a voltage representing said average current.

21. A circuit arrangement for measuring a magnetic field comprising:
   a saturable inductor for sensing a magnetic field to be measured;
   an oscillator circuit connected to said inductor for driving said inductor with a voltage waveform that causes current flow in the inductor to saturate the inductor in opposite directions in successive half-cycles, said oscillator circuit includes means switchable between two states to generate said voltage waveform;
   means connected to said inductor to generate an output signal representing the unbalance of saturation in successive half-cycles due to the magnetic field;
   said inductor is connected in a circuit path through which the inductor current flows and including current sensing means connected to said switchable means to develop a current-dependent signal causing switching of said switchable means to generate said voltage waveform, and a virtual ground point provided by said output means, said output means being responsive to the current at said virtual ground point.

* * * * *